United States Patent
Knutson

(10) Patent No.: US 6,983,204 B2
(45) Date of Patent: Jan. 3, 2006

(54) MAPPING TRAVEL ROUTES

(75) Inventor: James Irwin Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 10/797,823

(22) Filed: Mar. 10, 2004

(65) Prior Publication Data
US 2004/0172192 A1 Sep. 2, 2004

Related U.S. Application Data

(62) Division of application No. 10/042,497, filed on Jan. 9, 2002, now abandoned.

(51) Int. Cl.
G01C 21/30 (2006.01)
(52) U.S. Cl. .................................... 701/208
(58) Field of Classification Search ..............
701/200–202, 207–211, 117–120, 205; 340/988–993, 340/995, 996; 342/357.01, 357.08, 357.13, 342/357.06
See application file for complete search history.

(56) References Cited

U.S. PATENT DOCUMENTS

2003/0187573 A1 * 10/2003 Agnew et al. .............. 701/201

* cited by examiner

Primary Examiner—Thu V. Nguyen
(74) Attorney, Agent, or Firm—David A. Mims, Jr.; Robert V. Wilder

(57) ABSTRACT

A method and implementing computer system are provided in which route mapping for vehicles is determined between starting and destination points designated by an operator. Selected mapping is determined in accordance with operator selected travel-related criteria and augmented with traffic-related information. In one embodiment, after an initial route is set, the route is automatically updated whenever the vehicle strays from the set course, or whenever there is a change detected in related traffic conditions, or whenever subsequent changed travel points are input by the operator. The travel route and other related messaging may be conveyed to the operator by audio and/or visual devices onboard the vehicle.

7 Claims, 4 Drawing Sheets

MAPPING TRAVEL ROUTES

RELATED APPLICATIONS

The present application is a Divisional Application of patent application Ser. No. 10/042,497, filed on Jan. 9, 2002, which has been abandoned.

FIELD OF THE INVENTION

The present invention relates generally to information processing systems and more particularly to a methodology and implementation for determining a preferred travel route for vehicles.

BACKGROUND OF THE INVENTION

Computerized mapping systems are being developed in order to assist motorists in determining preferred routes in traveling between two or more locations. Examples of computerized mapping systems include: Map Quest™, Yahoo! Maps™, SMART pages™, AutoPilot™, and Rand McNally™. In addition to the above examples, Mercedes Benz and BMW have incorporated similar computerized mapping systems into their automobiles' on-board computer systems.

In general, computerized mapping systems function as follows. The operator enters a starting point and a destination. The computerized mapping system may access a map database containing road information. Each road in the database may be broken up into segments. The segments may begin and end at intersections, speed zones, or a change in the number of lanes. The information of a road segment in the map database may include: the length of the segment, speed limit, and which road segments connect to the endpoints of the segment. The mapping system may plot out a number of probable routes comprised of road segments connecting the starting point and the destination. An estimated travel time for each route may be calculated by summing the quotient of the distance traveled in a particular speed zone by the speed limit of the zone. A route may then be selected based on the shortest estimated time required to travel the route. The travel route may then be communicated to the operator.

If, however, an operator strays off-course from the designated selected route of travel, there is no way for the operator to become aware and make necessary course adjustments. Further, existing systems are frequently not up to date with regard to traffic delays which may be encountered while traveling the selected route. Further, this shortcoming results in mapping programs which provide incorrect information since traffic delays are not programmed into a calculation of the travel time to arrive at a designated destination. Instead, many current systems use the posted speed limit for travel segments in calculating travel time and traffic delays are not considered.

Thus there is a need for an improved methodology and implementing mapping system which provides more accurate information to a user regarding expected travel time, routing and on-course conditions of a vehicle in traveling between selected starting points and a destinations.

SUMMARY OF THE INVENTION

A method and implementing computer system are provided in which route mapping for vehicles is determined between starting and destination points designated by an operator. Selected mapping is determined in accordance with operator selected travel-related criteria and augmented with traffic-related information. In one embodiment, after an initial route is set, the route is automatically updated whenever the vehicle strays from the set course, or whenever there is a change detected in related traffic conditions, or whenever subsequent changed travel points are input by the operator. The travel route and other related messaging may be conveyed to the operator by audio and/or visual means onboard the vehicle.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer system which includes processing means, memory, updateable storage, input means and display means. Since the individual components of a computer system which may be used to implement the computer functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
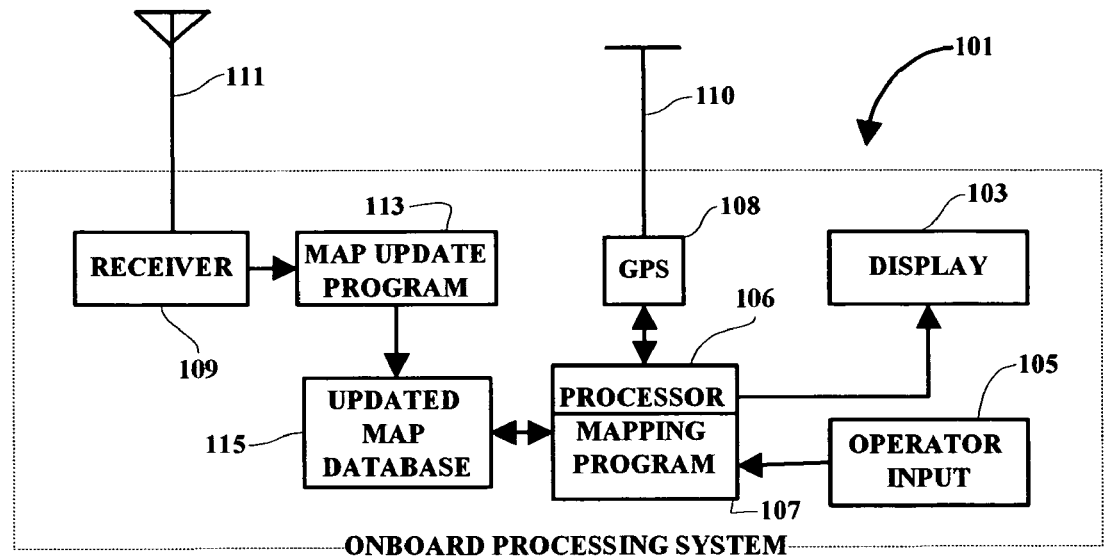
FIG. 1 is a block diagram of one embodiment of a system for mapping an optimal travel route, in accordance with the present invention.

One embodiment of a system for mapping an optimal travel route is illustrated in FIG. 1. As shown, the mapping system 101 is arranged on-board a vehicle being routed and includes computer hardware and software designed to receive a starting point and a destination, receive temporal or current traffic information, store traffic information in a map database, determine an optimal travel route, and communicate the optimal route to the operator. In FIG. 1, an operator uses a keyboard or other input device 105 to enter a starting point and a destination into the computer processor 106 which is running a mapping program 107. The input device 105 may also include a touch-screen display or voice input to a voice processing system (not shown). A display device 103 is also arranged to receive and selectively display mapping information developed by the mapping program 107. In the illustrated example, a global positioning system (GPS) 108 is arranged to receive satellite-based current vehicle position information from a GPS satellite through an antenna 110, and process that information to the mapping program 107. The GPS information may be stored within the GPS system and selectively retrieved by the mapping program 107. Also shown in FIG. 1 example is an RF receiver 109 which is arranged to receive traffic related and other routing information through antenna 111. The traffic information is processed by a map update program 113 and stored in an updateable map database 115 which is accessible by the mapping program 107. The mapping system may also include a CD (not shown) for loading initial mapping program data into the updated map database 115, although that database is continually updated with currently received traffic and other information received by receiver 109.

Figure 2:
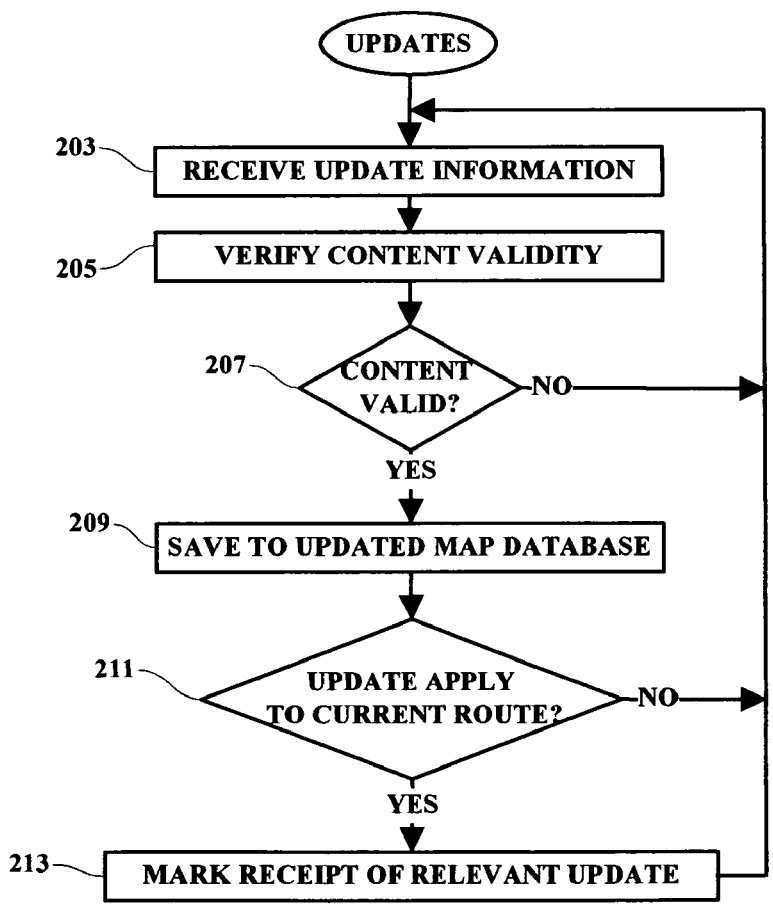
FIG. 2 is a flow chart of one embodiment of a method for receiving update information relevant to the travel route.

As shown in FIG. 2, the receiver 109 receives updated travel-related information 203 and proceeds to verify the received information 205. This may be accomplished by checking the data received in format and other means such as a "checksum" field as is hereinafter explained. Invalid information is not processed. However, if the received information is determined to be valid 207, the received information is saved to the updated map database 115 which is used by the mapping program 107 in determining, for example, the fastest route between two given points. The continual updating of the map database ensures that the most current information, including traffic flow rate information for the selected route, is contained in the map database and is used in any calculation of expected travel time along a given route. It is noted that all traffic and/or flow rate information received by receiver 109 is stored in the updated map database 115 even if such information does not directly apply to the route currently being traveled. A check is then made 211 to determine if the most recently received packet of traffic information applies to the current route being traveled. If not, the process returns to await receipt of the next update information packet 203. If the information packet applies to the current route 211, then a flag is set 213 to indicate that such an update has been received, and the process returns to await receipt of the next packet 203. Such an information update may indicate, for example, that a previous point of congestion has cleared and the route may be recalculated to determine a faster routing. The flag will indicate that this update information is available and may be accessed by the mapping program 107 to recalculate the fastest route.

Figure 3:
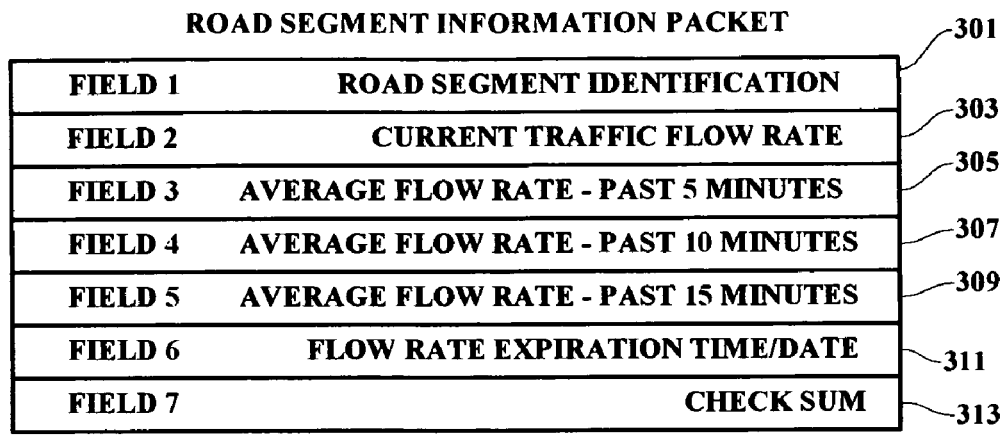
FIG. 3 is a table showing one embodiment of several exemplary fields included in an update road segment information packet.

The radio receiver 109 is tuned to a specific frequency at which traffic information is broadcast. The traffic information is in a format usable to the computer. The traffic information, for example, may comprise a plurality of packets of information pertaining to a segment of the route being traveled. In FIG. 3, there is shown an exemplary information packet including several exemplary fields of information. In a first field 301, information is contained to identify a particular road segment to which the update information applies. Another field 303 contains the current flow rate of the traffic along the designated road segment. In the illustrated example, three other fields 305, 307 and 309 are included to show average flow rates for past time periods, such as for preceding 5, 10 and 15 minute periods. Average flow rates may be used to determine trends in traffic flow conditions. In the next field 311 there is information to indicate when the flow rate and other data contained in the packet expires, and a last field contains a checksum number which is used to verify the validity of the information contained in the packet. The updated information is used by the route selection or mapping program so long as the expiration date of the temporal map segment data is some time in the future, i.e. has not yet expired. By detecting current traffic flow rates, the selected travel route and/or projected travel time may be updated or recalculated. Average flow rates may be used for this recalculation. The "check sum" field 313 may be a summation of all the numerical values contained in the information packet. Having received traffic information, the program may analyze the data to determine if the data is a valid traffic information packet. The check for validity may comprise summing all the numerical values in the traffic information packet and comparing the sum with the check sum 313 transmitted with the packet.

Figure 5:
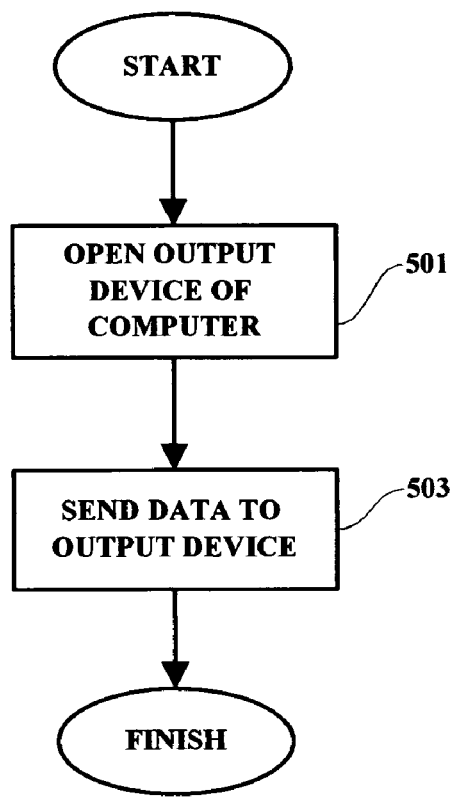
FIG. 5 is a flow chart illustrating an exemplary output method in providing routing information to an operator.
Figure 4:
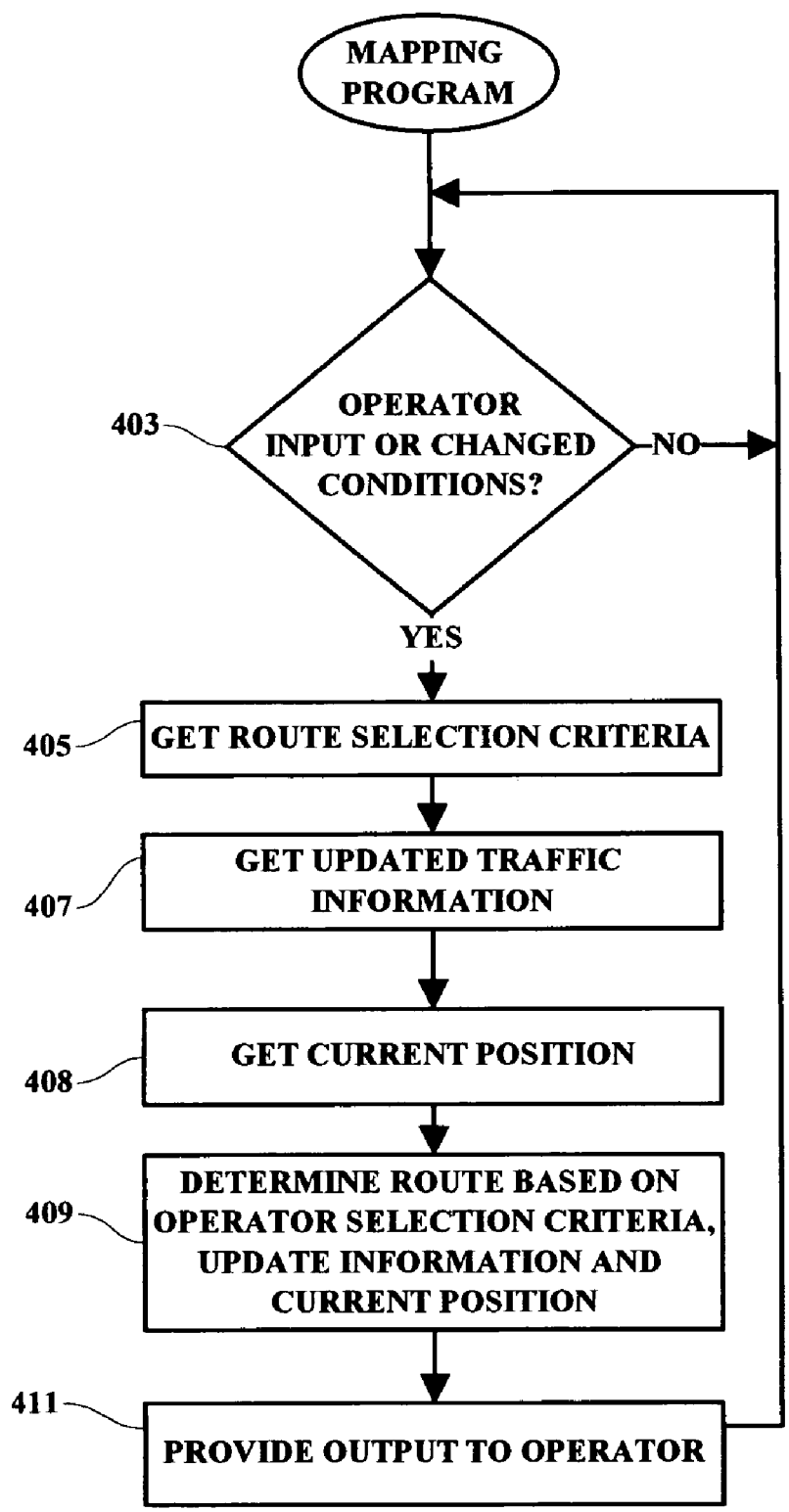
FIG. 4 is a flow chart of an exemplary routine for determining a preferred mapping route in accordance with the present invention.

As shown in FIG. 4, the mapping program 107 continually cycles to check for changed conditions. If any of the monitored conditions have changed 403, then the mapped route will be recalculated based upon the changed information. In the illustrated example, the monitored conditions include: (1) operator input for a new route; (2) changed traffic flow rate conditions for the segment being traveled; and (3) on-course condition as determined by comparing GPS data from GPS system 108 with stored points along the current route map. Other conditions may also be monitored to trigger a recalculation of the fastest route. In the present example, when it has been detected that one or more of the monitored conditions has changed, then the mapping program 107 operates to retrieve the route selection criteria 405 as well as the updated traffic information 407 and the current position of the vehicle 408. All information in the database is updated. When the route is calculated, a check for that segment determines if temporal data are used. If temporal data are valid, the available speed to use is determined by the time it takes to get from the current location to that segment and a prediction of the available speed when arriving at that segment. For segments close to the current position, current flow information can be used. When the destination is farther away, longer term average flow rates must be used to predict the available speed. For instance, a destination that is five minutes away using three segments may use the current flow rate for the first segment, then [current flow+(current flow−5 minute average)] for the last segment, and an interpolation between the two for the middle segment. The new route is recalculated 409 based upon the current operator selection criteria, update information and current position of the vehicle, and the output is sent 411 to an output device such as the display 103 or and audio output (not shown). As shown in FIG. 5, the output device e.g. 103 is opened 501 and the recalculated route is sent 503 to the output device. The recalculated route may be displayed on the display device 103 and/or announced audibly to the operator of the vehicle. Those skilled in the art will recognize that the route may be communicated to the operator using a variety of other methods including: speech synthesis systems, indicator lamps, and "heads-up" display technology.

Figure 6:
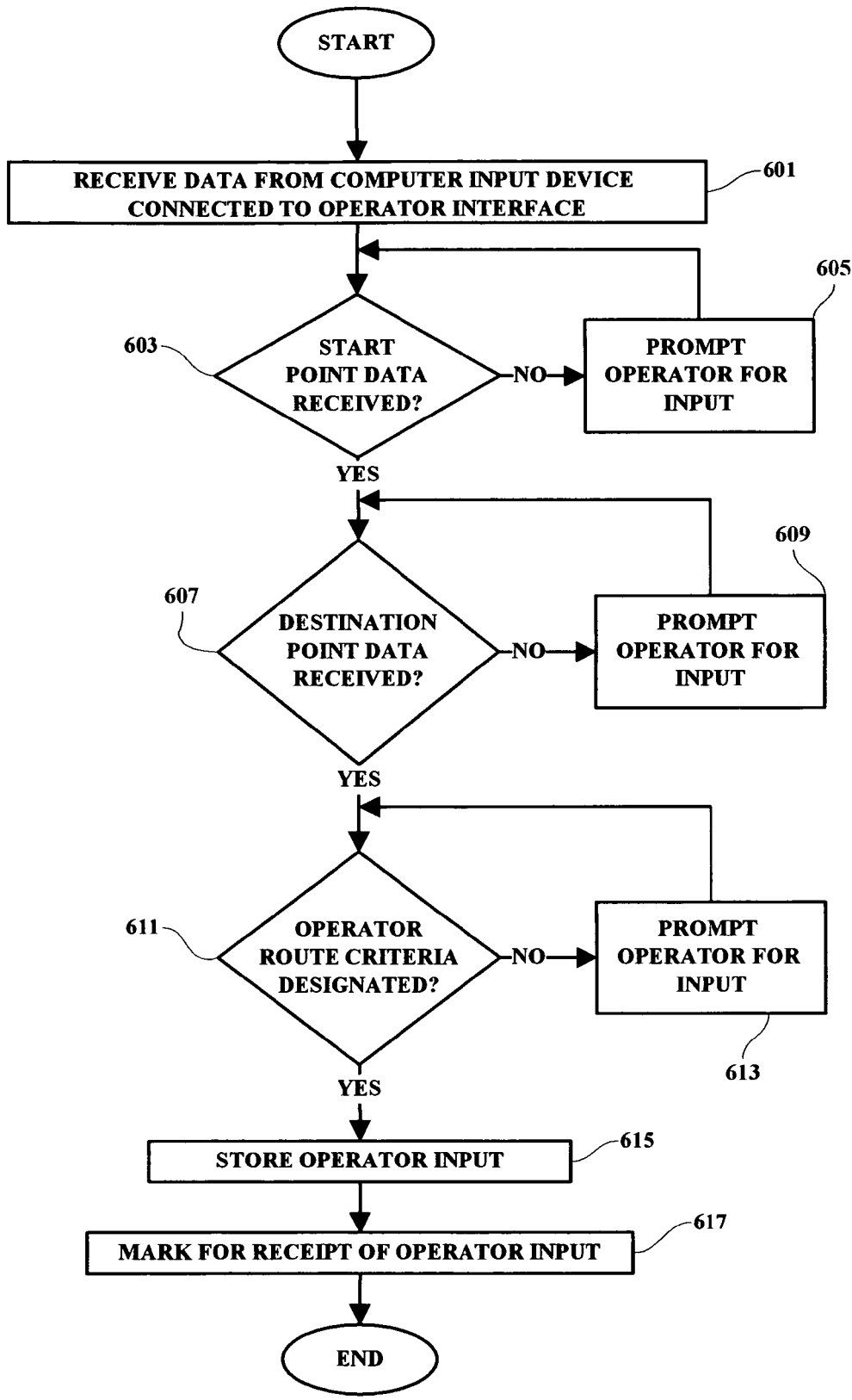
FIG. 6 is a flow chart illustrating an exemplary methodology for receiving operator input to the mapping system.

As shown in FIG. 6, operator input to the mapping program is processed by first receiving data 601 from the input device 105. The data is checked to insure that the data include a start point 603, a destination point 607 and operator preferred route criteria 611. Operator preferred route criteria will include input regarding whether the operator prefers the fastest route or the route having the shortest distance or possible the most picturesque route regardless of time or distance. If any of that information is missing, the operator is prompted 605, 609, 613 to provide the missing data. After all of the indicated information has been received, it is stored 615 and a flag is set 617 to indicate that there is new operator input information available. The mapping program 107 will detect the new input information and recalculate the route based upon the new operator input.

A preferred embodiment of the present invention includes a mobile route computing system which in turn contains a map database, a GPS system for automatically determining current position, and a radio receiver for receiving updated information. The database of information is kept by the mobile system and is updated in real time by a program which receives information dynamically. The means of update can vary from radio broadcast to direct Internet connection via satellite or cell phone, to removable media such as CDs or programmable memory cards or chips.

While the embodiments of the invention disclosed herein are presently considered to be preferred, various changes and modifications can be made without departing them the spirit and scope of the invention. The scope of the invention is indicated in the appended claims, and all changes that come within the meaning and range of equivalents are intended to be embraced therein.

What is claimed is:

1. A method for automatically updating a selected travel route for a vehicle from a current position of a vehicle to a predetermined destination, said method comprising:

determining said selected travel route, said selected travel route comprising a series of travel segments along said selected travel route, said selected travel route being based upon a first set of segment traffic flow rates for said travel segments;

receiving current position information related to a current position of said vehicle;

periodically receiving real-time segment traffic flow rates for said travel segments;

determining average traffic segment flow rates for said travel segments for differing time periods for each of said travel segments; and recalculating said selected travel route to provide a new travel route, said new travel route being based upon said real-time segment traffic flow rates and said average segment traffic flow rates whereby said real-time segment traffic flow rates are used in determining new nearby travel segments which are nearby said current position of said vehicle and said average traffic segment flow rates are used in determining new distant travel segments which are nearby said destination.

2. The method as set forth in claim 1 and further including interpolating between said real-time segment traffic flow rates and said average segment flow rates to provide interpolated traffic segment flow rates whereby said interpolated traffic segment flow rates are used in determining new travel segments which are between said nearby travel segments and said distant travel segments.

3. The method as set forth in claim 2 wherein said current position information is received from a global positioning system (GPS) on a continuing basis.

4. The method as set forth in claim 1 wherein said recalculating is accomplished using said current position as a starting point for said new travel route.

5. The method as set forth in claim 1 wherein said recalculating is accomplished whenever predetermined changes are detected in either said traffic conditions or whenever said current position is not along said selected travel route.

6. The method as set forth in claim 5 wherein said recalculating is accomplished only whenever said predetermined changes exceed a predetermined threshold value.

7. The method as set forth in claim 6 wherein said recalculating is accomplished only whenever said changes exceed said predetermined threshold value for a predetermined period of time.

* * * * *